D. D. McMILLIN.
CULTIVATOR ATTACHMENT.
APPLICATION FILED FEB. 9, 1911.

991,341.

Patented May 2, 1911.

2 SHEETS—SHEET 1.

Witnesses
Inventor
Dode D. McMillin,
By
Attorneys

D. D. McMILLIN.
CULTIVATOR ATTACHMENT.
APPLICATION FILED FEB. 9, 1911.

991,341.

Patented May 2, 1911.

2 SHEETS—SHEET 2.

Witnesses
J. L. Dobbins,
Francis Boyle

Inventor
Dode D. McMillin,
By Chandler & Chandler
Attorneys

UNITED STATES PATENT OFFICE.

DODE D. McMILLIN, OF QUENEMO, KANSAS.

CULTIVATOR ATTACHMENT.

991,341. Specification of Letters Patent. Patented May 2, 1911.

Application filed February 9, 1911. Serial No. 607,499.

*To all whom it may concern:*

Be it known that I, DODE D. MCMILLIN, a citizen of the United States, residing at Quenemo, in the county of Osage, State of Kansas, have invented certain new and useful Improvements in Cultivator Attachments; and I do hereby declare the following to be a full, clear, and exact description of the invention, such as will enable others skilled in the art to which it appertains to make and use the same.

This invention relates to cultivators and has for its object to provide a novel stalk cutter that may be readily secured to most of the cultivators commonly known as gang disk cultivators.

A further object of the invention is to provide a stalk cutter which may be secured in position through the instrumentality of a pair of bolts, the stalk cutter hangers being so constructed as to form lock nuts which will prevent working loose of the bolts and consequent wabbling of the stalk cutter during operation.

With the above objects in view the invention resides specifically in the novel form of stalk cutter hanger and more generally in the novel details of construction and combination of parts hereinafter fully described and claimed.

Figure 1:
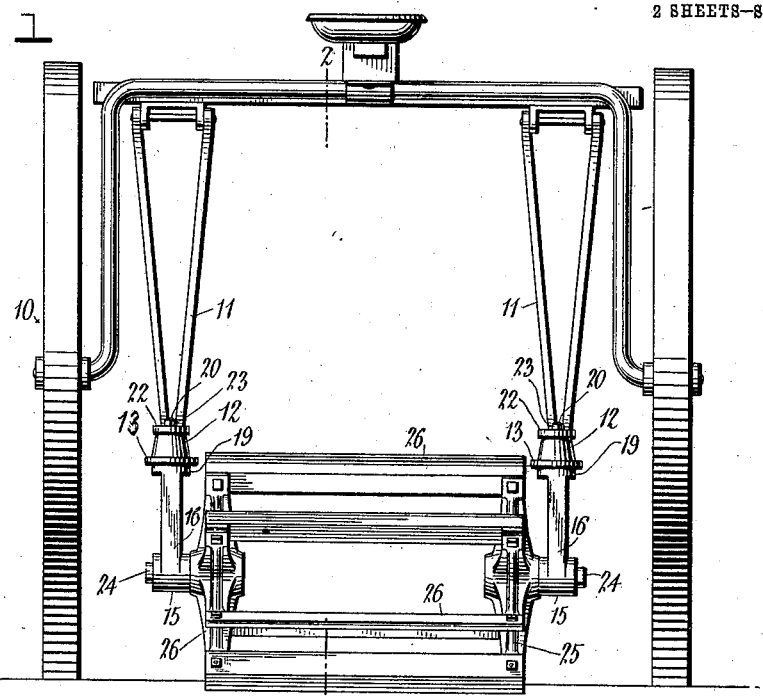
Figure 2:
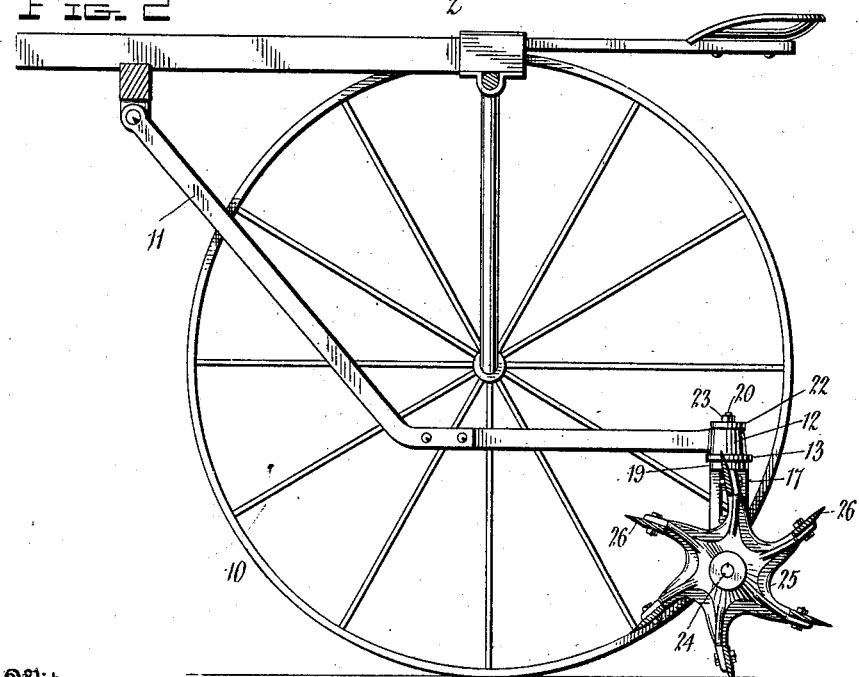
Figure 3:
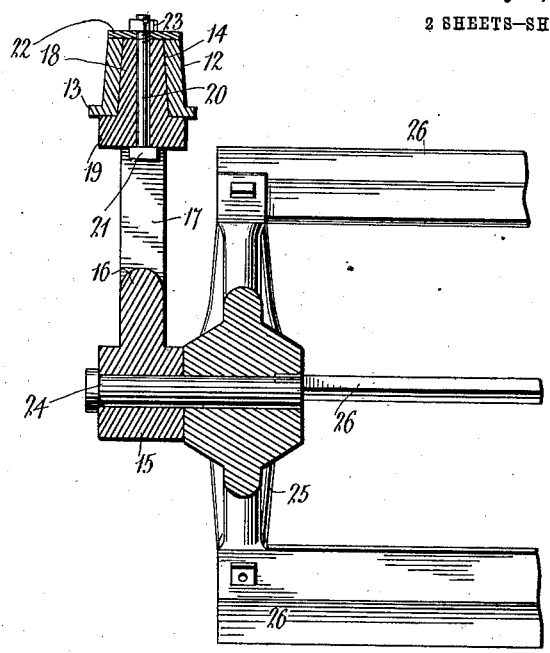
Figure 4:
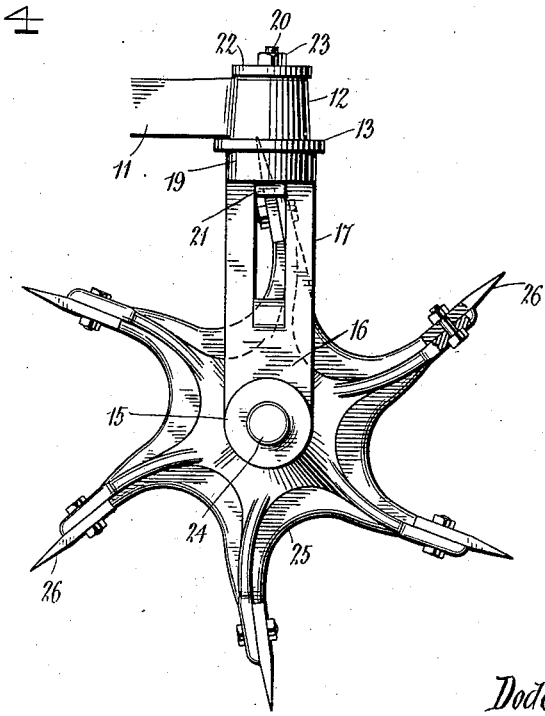

In the accompanying drawing forming part of this specification, Figure 1 is a rear elevation of a cultivator with stalk cutters embodying my improvements attached thereto. Fig. 2 is a longitudinal sectional view taken on the line 2—2 Fig. 1. Fig. 3 is an enlarged longitudinal sectional view through the stalk cutter. Fig. 4 is an end elevation of the stalk cutter shown in Fig. 3.

Referring now to the drawing in which like characters of reference designate similar parts, a cultivator 10 of the ordinary sulky type is shown, this cultivator having rearwardly extending gang beams 11, the rear end of each beam terminating in a vertically disposed tubular bearing 12 the lower edge of which is formed with a substantially circular flange 13, and the bore of this bearing is tapered as shown at 14 in order to snugly receive the tapered spindle of the stalk cutter hanger.

The stalk cutter hangers each comprise a tubular bearing head 15 from one side of which extends a shank 16, the shank being provided centrally with a longitudinal recess which lightens the shank and forms spaced parallel arms 17, these arms being terminally connected by a tapered hollow spindle 18 which is designed to snugly fit in the bore of the gang bearing, and is provided at its juncture with the arms with a circular stop flange 19 which is designed to abut the lower face of the gang bearing flange 13. A bolt 20 is engaged through the bore of the spindle, the head of the bolt 21 fitting between the spaced arms of the hanger, and being of such size as to be incapable of rotation between the arms, the arms consequently serving as a lock nut. A washer 22 encircles the bolt and bears against the top face of the gang beam bearing, and a nut 23 is threaded on the bolt and advanced into frictional contact with the washer, and serves to draw up the bolt until the upper and lower faces of the gang bearing are frictionally engaged by the flange 19 and washer 22 of the hanger, and independent rotation of the spindle within the bearing positively prevented until the nut is loosened.

A shaft 24 is revolubly mounted in the bearing head 15 of the hanger, and to one end of this shaft is keyed a curvilinear spoked wheel 25. The spokes of the wheels of both hangers are connected by cutting blades 26 which sever stalks near their roots during advancement of the stalk cutter over a stubble field.

It will be noted that the hangers of the stalk cutter are secured to the cultivator gang beam through the instrumentality of but two bolts which are positively held against rotation during the operation of applying the stalk cutter to the beam and also during advancement of the stalk cutter over a stubble field, and thus the time and manual labor necessary for applying the device is reduced to a minimum and also wabbling of the device while cutting stalks positively prevented.

What is claimed, is:—

A stalk cutter including a hanger having a tubular bearing head, a shank projecting from said head having a longitudinal recess forming spaced oppositely disposed arms, a hollow spindle connecting the terminals of said arms and having a stop flange in close proximity to said arms, a bolt engaged through the bore of said spindle and having its head against said stop flange and between said arms, said arms preventing rotation of the bolt head, a washer on said bolt, a nut on said bolt engageable with the outer face of said washer and operating to move said washer in the direction of said stop flange whereby the washer and stop flange co-act in forming a clamp, a shaft engaged through said head, and a stalk cutting wheel mounted on said shaft.

In testimony whereof, I affix my signature, in presence of two witnesses.

DODE D. McMILLIN.

Witnesses:
L. L. MABIE,
H. W. DICKSON.

---

Copies of this patent may be obtained for five cents each, by addressing the "Commissioner of Patents, Washington, D. C."